L. M. DUNN.
COLOR CHART.
APPLICATION FILED NOV. 28, 1913.
1,125,078. Patented Jan. 19, 1915.
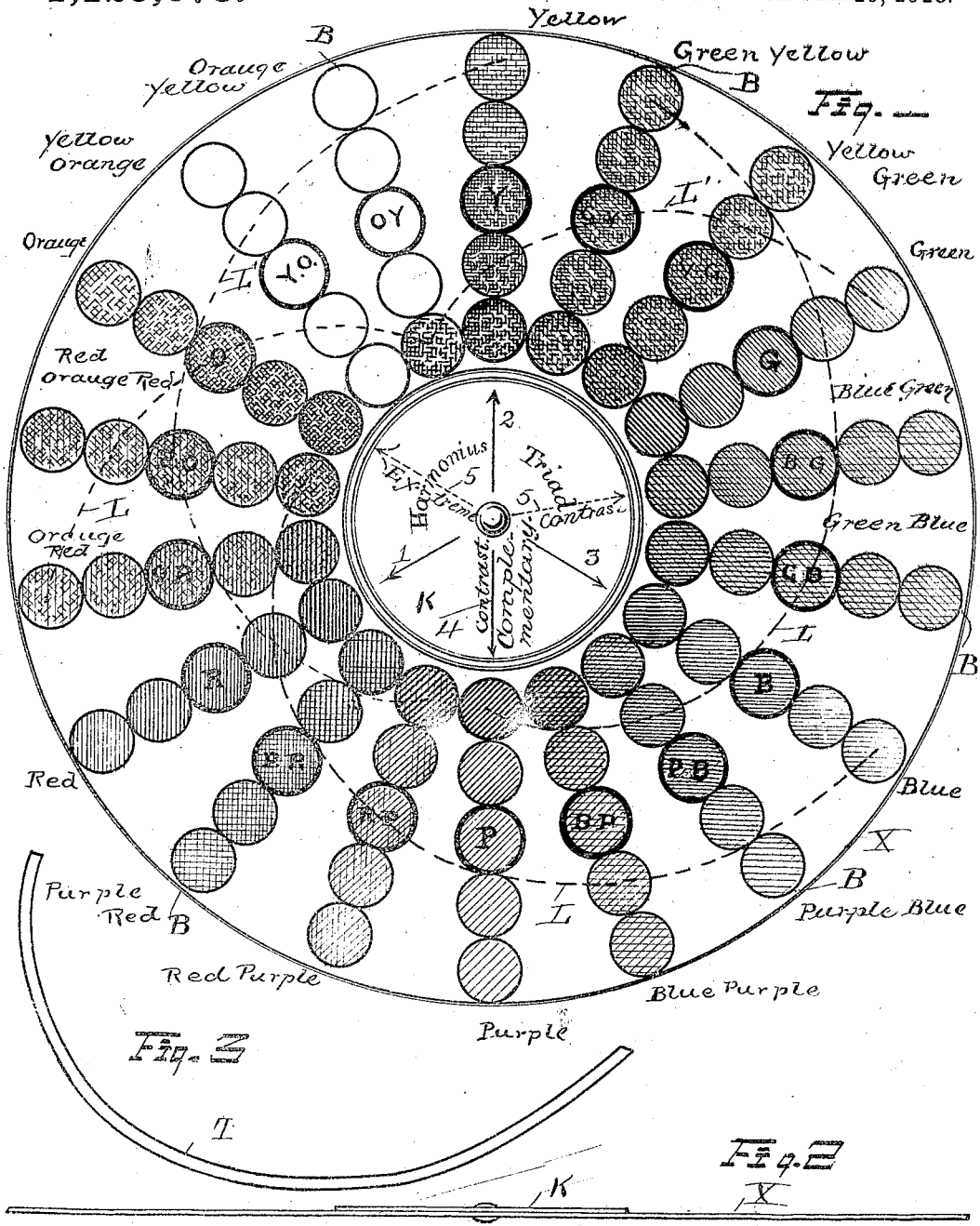

UNITED STATES PATENT OFFICE.

LOUISE M. DUNN, OF CLEVELAND, OHIO.

COLOR-CHART.

1,125,078.  Specification of Letters Patent.  Patented Jan. 19, 1915.

Application filed November 28, 1913. Serial No. 803,530.

*To all whom it may concern:*

Be it known that I, LOUISE M. DUNN, a citizen of the United States, and resident of Cleveland, in the county of Cuyahoga and State of Ohio, have invented certain new and useful Improvements in Color-Charts, of which I hereby declare the following to be a full, clear, and exact description, such as will enable others skilled in the art to which it appertains to make and use the same.

The objects of the invention are to provide a chart containing the primary and secondary colors of the physical spectrum together with other arbitrary colors and so arranged in a circle and so displayed as to be readily distinguishable and spaced apart at regular intervals and in their natural orders to permit of the introduction between them of the intermediate modified or blended colors ordinarily employed in the industrial trades or arts.

Further objects are to provide a combination and arrangement with the elementary and intermediate colors of the shades and tints thereof, arranged selectively in radial order with their basic colors in such a manner that triads and simple and progressive sequences of harmonious colors and tints and shades thereof can readily be ascertained by operators unfamiliar with artistic combinations and inexperienced in combining colors, and by means of which they can always produce artistic color effects and beautiful gradations of colors by simply matching the indicated colors in the chart.

By means of this chart a simple, practical and efficient means is provided for recognizing at once the natural law of contrasting colors that is the physical or extreme contrast, the complementary or harmonious contrasts, and the partial and harmonious contrast in colors.

The colors of the spectrum placed on the physicist's color triangle for their relative contrasts are too sharp for agreeable contemplation and produce a greater contrast than is ordinarily desired. This dial is designed to lengthen the color band of the spectrum into regular gradated intervals with two added colors, purple and purple red and their intermediates, to admit of more harmonious contrast adapted to the use of the decorative arts. By means of this invention the color bands of the primaries and secondaries are lengthened out together with the intermediate colors, throughout the spectrum from yellow to yellow, thereby providing a greater number of possible combinations of color and a more gradual gradation from one color to another.

The chart is essentially useful to all decorators and craftsmen such as dressmakers, milliners, window trimmers, designers of stained glass and all artists and artisans whose craft makes it necessary to select and combine color areas and gives also the simplest means for determining the area apportioned to each color to give an agreeable effect. It is also useful to all who are engaged in making color mixtures and in printing colors, and is also the simplest educational chart and device for teaching chromatics in the school room.

To obtain the aforesaid advantages the chart comprises the circular arrangement of primary and secondary colors and radial arrangement of shades and tints thereof, the color areas of shades and tints being preferably equal in all instances and the primary and secondary colors being distinguished by border lines or in some other distinctive manner, corresponding shades and colors being equally spaced upon the chart, in the manner hereinafter more fully described, shown in the accompanying drawings and specifically pointed out in the claims.

In the accompanying drawings Figure 1 is a plan view of the chart showing curved lines thereon indicating the positions of simple and progressive sequences of color and the means for determining the same, and also showing a rotatable dial having lines thereon indicating physical contrasts, straight contrast and harmonious triads respectively; Fig. 2 is a side elevation thereof; Fig. 3 is a detail showing a curved edge employed to lay upon the chart to determine progressive sequences; Fig. 4 is a similar curve employed to determine more simple sequences.

In these views Y, G, B, P, R, and O, upon a chart X represent respectively the brightest elementary colors of yellow, green, blue, purple, red and orange, shown in areas of equal size. In radial lines B, B, passing through these elementary colors and of slightly smaller size are arranged the shades and tints thereof, the shades being preferably central in position, and the tints occupying the outer edges of the chart. Intermediate between the radial lines of elementary colors are arranged the intermediate colors and their shades and tints in similar manner, viz: G. Y. for green yellow, Y. G. for yellow green, G. B. for green blue, B. G. for blue green, P. B. for purple blue, B. P. for blue purple, R. P. for red purple, P. R. for purple red, O. R. for orange red, R. O. for red orange, Y. O. for yellow orange, O. Y. for orange yellow. The darker shades at one edge preferably grade to the lightest tints at the outer edges of the dial, all tints and shades are arranged in circles concentric with the circle containing the elementary colors, the shades and tints in any given circle being substantially of equal intensity.

To employ this chart the elementary colors are readily seen at the center of each radial line. A combination of those colors or a harmonious triad such as yellow, blue, and red is indicated upon a rotatable dial K in the center of the chart upon which indicating lines 1, 2, 3, are shown suitably spaced thereon. This dial can be turned to designate any combinations of three colors which will always be harmonious in effect wherever the dial is placed. At 4 is shown a diametrical line which will always designate opposite colors which are harmonious when combined but contrasting and are the complementary colors, such as yellow and purple, and red and green, blue and orange, and the dotted lines 5, 5 designate on the upper half of the chart stronger contrasts such as are seen in the color triangle. These are the true physical contrasts and are produced by waves of light differing greatest in wave length. Each radial line shows the color of greatest intensity in the center and the line forms a graduated harmony within one color from light to dark. This harmony is made most striking by selecting the color spots at the opposite edges and center and the central circle or spot can be distinguished from the others by means of a thicker outline or other distinguishing feature.

A sequence is a color harmony produced by selecting colors around the dial from right to left or from left to right and if selected on any one circle the sequence will be in one shade or tint only. A progressive sequence is a harmony of color that progresses from light to dark or vice-versa through a given number of colors and shades and tints thereof and is taken on a diagonal or spiral course over the dial through every color as shown at L′, L′ Fig. 1, or skipping every other color as shown at L, L Fig. 1. The progressive sequences formed by skipping every other color are more extended and striking than the sequences obtained by including each color in the diagonal course.

To facilitate determining these sequences, a narrow curved ruler T which may be transparent if desired, can be laid directly upon the chart or a line L can be printed thereon to connect any desired shades and tints as purple with green yellow through purple blue, green blue and green. The most artistic and beautiful combinations of colors can be obtained in this manner, which are attractive to the eye and require no previous experience to obtain. There are 36 of these progressive sequences of each sort possible to obtain upon this dial and it covers practically the range of colors that could be used in the industrial arts. Also the contrasts obtainable range from the greatest possible difference between two colors to all harmonious modifications thereof. The triads include any three colors spaced at equal distances from each other on the dial. There are 18 combinations of triads obtainable on the dial. This dial can be employed for obtaining the proper areas or proportions of colors and to produce the necessary balance of color in any creation, that is the colors which must be selected in quantities or intensities that will permit the eye to travel over them without being unduly attracted to any part or color in the combination and made to dwell there more than upon any other part. For instance the combination of elementary yellow with elementary violet in the central circle would require a one third greater area of violet than yellow to permit the eye to tarvel easily from one color to another, hence the elementary colors are rarely combined in their most intense forms and in equal areas. These color areas can readily be balanced on the chart by connecting the darkest shade of yellow in the inner circle with the most intense color of violet in the middle circle, thus balancing the areas. Again, to balance a triad such as orange, green and violet, the brightness of the orange and green overpower the violet, hence the darkest shade of orange and green combine harmoniously with the middle or elementary violet, and the combination is balanced permitting the eye to disengage itself from the orange and green. The purposes for which the colors are used will influence somewhat the relative proportions of the color areas. The tints combine readily with tints and the shades with shades. Therefore, to combine one of the elementary colors with one on the inner or outer circles decreases the areas of the elementary color and increase the area of the shade or tint correspondingly. In forming the more extended sequences the area of the elementary color does not require reduction to form a perfect balance of color. In using the line of greatest contrast the contrasts have a physical power corresponding to the physical law of contrast but can be applied only to a portion of the chart. The law of contrast remains the same under saturation from superimposed transparent colors although all colors will not endure saturation equally well.

It is understood that the combinations of elementary or intermediate colors with the shades and tints of colors taken in progressive sequence upon diagonal or spiral lines on the chart will always be harmonious and relative areas can be modified to suit the taste of the craftsman.

Having described the invention what I claim as new and desire to secure by Letters Patent is:

1. In a color chart, in combination, a series of circularly arranged color areas representing the elementary colors and intermediate colors, each color being located in a radial line, a series of color areas representing tints and shades of each color in the respective radial lines, and arranged in circles concentric with the circle of the said areas of elementary and intermediate colors, and a central rotatable dial, said dial provided with means for designating the colors of greatest contrast, the complementary colors and triads of harmonious colors.

2. In a color chart, in combination, a series of elementary colors and a series of intermediate colors arranged in a common circle, and tints and shades of said colors arranged in radial lines passing through their respective colors and also arranged in concentric circles, the lightest tints occupying the outer circle and the darkest shades the inner circle and means for distinguishing the circle of elementary and intermediate colors.

3. In a color chart, in combination, a series of circularly arranged color areas representing the elementary colors and intermediate colors, each color being located in a radial line, a series of color areas representing tints and shades of each color in the respective radial lines, and arranged in circles concentric with the circle of the said areas of elementary and intermediate colors, and means for indicating sequences of harmonious combinations of color, leading from a selected central area of elementary color in one radial line, in both directions through adjoining radial lines, toward the marginal colors and tints on one side and the inner circle of colors and shades on the other side, of the radial line.

In testimony whereof, I hereunto set my hand this 24" day of November 1913.

LOUISE M. DUNN.

In presence of—
Wm. M. Monroe,
P. Bredel.